Patented May 24, 1938

2,118,445

UNITED STATES PATENT OFFICE 2,118,445

PRODUCTION AND SEPARATION OF ISOMERIC AMINOHYDROXY ANTHRAQUINONES

Donald G. Rogers, Ridgewood, N. J., assignor to National Aniline & Chemical Company, Inc., New York, N. Y., a corporation of New York No Drawing. Application May 13, 1936, Serial No. 79,498

26 Claims. (Cl. 260—59)

This invention relates to improvements in the production of aminohydroxyanthraquinones and their sulfonic acids, and more particularly to improvements in the production and/or recovery in a purified condition of diaminopolyhydroxyanthraquinone sulfonic acids. The invention is especially concerned with improvements in the production and/or purification of alpha-diamino-alpha-dihydroxy-anthraquinone sulfonic acids, such as diaminoanthrarufine disulfonic acid and diaminochrysazine disulfonic acid, and comprises certain process steps, and the relation of one or more of said steps with other process steps, which will be exemplified in the process hereinafter disclosed. The scope of the invention will be indicated in the appended patent claims.

An object of the present invention is to provide a process whereby aminohydroxyanthraquinones may be obtained in a purified condition. Additional objects of the invention are to provide a process whereby alpha-amino-alpha-hydroxy-anthraquinones, and particularly their sulfonic acids, may be obtained in a purified condition from technical mixtures of said products containing impurities resulting from the production of said products by the reduction of their corresponding nitro compounds; and to provide a process whereby certain of said alpha-amino-alpha-hydroxy-anthraquinones may be separated from each other.

Further objects of the present invention are to provide improvements in the process of recovering diaminoanthrarufine disulfonic acid in a purified condition from the reaction mixture resulting from the reduction of dinitroanthrarufine disulfonic acid; to provide an improved process of recovering alpha-diamino-polyhydroxy-anthraquinone sulfonic acids in a purified condition from reaction mixtures resulting from the reduction of the corresponding nitrohydroxyanthraquinone compounds with sulfur and oleum; to provide a process whereby diaminoanthrarufine disulfonic acid can be obtained in a relatively pure form from a crude diaminoanthrarufine disulfonic acid containing diaminochrysazine disulfonic acid; and to provide a process whereby diaminoanthrarufine disulfonic acid and diaminochrysazine disulfonic acid may be obtained in a purified condition and relatively free from each other by the reduction of a technical dinitroanthrarufine disulfonic acid containing dinitrochrysazine disulfonic acid and other anthraquinone compounds as impurities, especially with the aid of sulfur, oleum and boric acid as the reducing medium.

Another object of the present invention is to provide improvements in the process of reducing nitrohydroxyanthraquinones, and especially alpha-dinitro-alpha-dihydroxy-anthraquinone sulfonic acids, to their corresponding aminohydroxyanthraquinones with the aid of sulfur and oleum, whereby improvements in the yield and quality of the resulting aminohydroxyanthraquinones are obtained.

Other objects of the invention will in part be obvious and will in part appear hereinafter.

The aminohydroxyanthraquinones (that is, the derivatives of anthraquinone which contain at least one amino group and at least one hydroxyl group as nuclear substituents) are well known organic chemical products which are useful as dyestuffs and as intermediates. Among said products, the polyamino-polyhydroxy-anthraquinone sulfonic acids, and particularly the alpha-diamino-alpha-dihydroxy-anthraquinone sulfonic acids (that is, those which contain the hydroxyl and the amino groups in the alpha-positions of the anthraquinone nucleus) are useful as dyestuffs for wool, as intermediates for the production of lakes, and as intermediates for the production of other dyestuffs. In general, they are produced by the reduction of the corresponding nitro compounds, and contain as impurities hydroxylamino-, amino-, hydroxy-, and other amino-hydroxy-anthraquinone compounds. For many uses, the presence of the impurities is undesirable since the impurities affect the shade and/or the brightness of dyeings made with said products, or affect the shade and/or produce dullness of lakes made from said products, or otherwise interfere with the maximum utility of said products.

In the case, for example, of diaminoanthrarufine disulfonic acid (4,8-diamino-1,5-dihydroxy-anthraquinone disulfonic acid), which is useful as a blue acid dyestuff for wool and as an intermediate for the production of blue aluminum lakes, the presence of certain impurities dulls the dyeings produced with said dyestuff as well as the aluminum lakes obtained therefrom, and causes the dyeings or lakes to have less of a greenish cast than is desirable for certain purposes.

Diaminoanthrarufine disulfonic acid is produced in practice, in accordance with one well known method of procedure, by sulfonating and then nitrating anthrarufine (1,5-dihydroxyanthraquinone) and reducing the resulting dinitroanthrarufine disulfonic acid. The reduction is carried out with an alkaline or acid reducing agent; for example, with an alkali metal sulfide in an alkaline medium, or with sulfur and oleum (sulfur sesquioxide) in the presence or absence of boric acid. Frequently the anthrarufine employed as an intermediate for the production of diaminoanthrarufine disulfonic acid contains various amounts of other anthraquinone compounds. Thus, one form of technical anthrarufine contains chrysazine (1,8-dihydroxyanthraquinone), and, unless the latter is separated from the anthrarufine compound during the production of the diaminoanthrarufine disulfonic acid, it appears in the final product as diaminochrysazine disulfonic acid (4,5-diamino-1,8-dihydroxyanthraquinone disulfonic acid). While the resulting mixture of diaminoanthrarufine disulfonic acid and diaminochrysazine disulfonic acid is useful as such for many purposes, since many of their properties are similar, in certain cases it is desirable that the diaminoanthrarufine disulfonic acid be relatively free from the chrysazine isomer as well as from impurities.

In producing aminohydroxyanthraquinones from the corresponding nitrohydroxyanthraquinones by reduction with sulfur and oleum, it has heretofore been the usual practice to add the nitrohydroxyanthraquinone to a solution of the sulfur in the oleum, in the absence or presence of boric acid, and to regulate the temperature of the mixture during and after the addition in accordance with the product desired to be produced and the other conditions of the reaction. Thus, in the reduction of dinitroanthrarufine disulfonic acid, or dinitrochrysazine disulfonic acid, to the corresponding amino compound, the dinitro compound has been added to a solution of boric acid and sulfur in 30 per cent. oleum at a temperature of 30° C., and the mixture allowed to warm up to about 50° C. The yield and purity of the products thus obtained, however, are not as satisfactory as are desired, since the aforementioned procedure results in the formation of by-products and impurities.

I have found that aminohydroxyanthraquinones, and particularly isomeric aminohydroxyanthraquinones, form salts in the presence of sulfuric acid which differ in their solubility in sulfuric acid from each other and/or from the solubility in said sulfuric acid of impurities usually present in crude, technical, or commercial aminohydroxyanthraquinones. I have furthermore found that the difference in solubility in sulfuric acid of said salts and said impurities is advantageously affected by the presence of boric acid. Thus, I have found that diaminoanthrarufine disulfonic acid forms salts with concentrated sulfuric acids whose solubility is materially different from the solubility of the diaminochrysazine disulfonic acid salts with said sulfuric acids, and that the separation of diaminoanthrarufine disulfonic acid from diaminochrysazine disulfonic acid with the aid of concentrated sulfuric acids is enhanced by the presence of boric acid. Although the nature of the salts formed in the presence of the sulfuric acid is not definitely known, it appears that they are generically amine-salts, that is, salts in which the acidic radical of the salt is bound to a nitrogen atom of an amino-group of the aminohydroxyanthraquinone. The acidic radical may be derived from the sulfuric acid, or in the case of aminohydroxyanthraquinone sulfonic acids it may be a sulfonic acid radical of the same or another molecule of aminohydroxyanthraquinone sulfonic acid. When boric acid is present, the said salts may contain boric acid as an acidic radical, or may be complex sulfuric-boric acid compounds. Whatever is the correct explanation and actual composition of the said salts, it is to be noted that the invention is not limited by any such theoretical considerations. For convenience, hereinafter in the description and claims, however, the said salts will be referred to as "amine salts".

I have furthermore found, when the aminohydroxyanthraquinone is obtained as a solution or suspension in sulfuric acid resulting from a prior process whereby the aminohydroxyanthraquinone was produced, that it is not necessary to isolate the crude aminohydroxyanthraquinone from the reaction mixture before subjecting it to the purification process, but that the purification and isolation may be combined into a single process, thereby reducing the cost and increasing the yield of the purified product. Thus, I have found that the process of recovery and/or purification of diaminoanthrarufine disulfonic acid of the present invention can be directly applied to the reaction mixture resulting from the reduction of dinitroanthrarufine disulfonic acid with oleum and sulfur, and especially when the reduction is carried out with the aid of boric acid.

I have also found that improvements in the yield and quality of aminohydroxyanthraquinones are obtained in the process of reducing nitrohydroxyanthraquinones, and especially alpha-dinitro-alpha-dihydroxy-anthraquinone sulfonic acids, to their corresponding aminohydroxyanthraquinones with the aid of sulfur and oleum, by adding the sulfur and nitrohydroxyanthraquinone simultaneously to the oleum. Thus I have found that the yield and purity of diaminoanthrarufine disulfonic acid are increased by adding a mixture of dinitroanthrarufine disulfonic acid and sulfur to the oleum. As in the known processes the oleum preferably contains boric acid.

In the practice of the present invention, the crude (e. g., technical or commercial) aminohydroxyanthraquinone is subjected to the action of sulfuric acid in an amount and of a concentration adapted to form a salt of the type previously referred to, of said aminohydroxyanthraquinone, which salt is insoluble in said sulfuric acid, the resulting insoluble salt is separated from the remaining sulfuric acid solution of another aminohydroxyanthraquinone and/or impurities, and the separated salt is recovered. It may be employed as such, or it may be treated to regenerate the aminohydroxyanthraquinone which may be recovered in any suitable manner.

The crude aminohydroxyanthraquinone may be in any suitable form and may be produced in accordance with any of the processes well known to the art. The sulfuric acid treatment may be carried out in any suitable manner and under any suitable conditions of temperature and concentration. Thus, in accordance with one method of procedure, the crude aminohydroxyanthraquinone may be treated with sulfuric acid of a concentration adapted to form the amine salt of said aminohydroxyanthraquinone, which salt is insoluble in said sulfuric acid under the prevailing temperature conditions, whereby the impurities are dissolved in said sulfuric acid while the aminohydroxyanthraquinone is not dissolved but remains as the insoluble salt, and the resulting solution of impurities may be separated from the said salt, as for example, by filtration or any other suitable method. Or, in accordance with another method of procedure, the crude aminohydroxyanthraquinone may be subjected to the action of sulfuric acid of a suitable concentration and at a suitable temperature to form a solution thereof; the sulfuric acid concentration of the resulting solution then may be adjusted (for example, by fortification with more concentrated sulfuric acid or by dilution with water or more dilute sulfuric acid) to a value such that an amine salt of the aminohydroxyanthraquinone is produced which is insoluble in the resulting sulfuric acid, after adjustment of the temperature, if required, but impurities are retained in solution; and the said salt may then be separated from the solution of impurities, as for example, by filtration. Boric acid may or may not be present during the sulfuric acid treatment, but it is preferably present as it enhances the purification. The temperature at which the solution of impurities is separated from the said salt may be varied, it depending upon whether purity or yield is the prime consideration; a somewhat higher yield being obtained at lower temperatures and a somewhat purer product being obtained at higher temperatures with the same concentration of sulfuric acid.

The process may also be employed in conjunction with processes of producing the aminohydroxythraquinone in which the crude aminohydroxyanthraquinone is obtained in the form of a solution or suspension in sulfuric acid, in which case the surfuric acid concentration of the solution or suspension resulting from said process of production may be modified as above described to produce the insoluble amine salt of the aminohydroxyanthraquinone and the sulfuric acid solution of impurities, which may then be separated from each other. In this manner an intermediate isolation of the crude aminohydroxyanthraquinone from the reaction mixture in which it was produced may be eliminated.

The aminohydroxyanthraquinone may be regenerated from the separated salt (amine salt) and recovered in any suitable manner. Thus, the said salt may be treated with water or dilute sulfuric acid to reconvert it to the aminohydroxyanthraquinone, preferably with cooling so as to prevent decomposition or side reactions, and the aminohydroxyanthraquinone may then be recovered from the resulting mass in any suitable manner.

The process may also be employed for the separate recovery of individual aminohydroxyanthraquinones from a mixture thereof, or from a mixture containing a plurality of aminohydroxyanthraquinones together with impurities. Thus, such a mixture may be treated in accordance with the procedures hereinbefore described to recover one aminohydroxyanthraquinone, and a second aminohydroxyanthraquinone may be recovered from the sulfuric acid solution remaining after separation of the first aminohydroxyanthraquinone salt, by further adjustment of the sulfuric acid concentration of the remaining solution to an extent such that a salt of a second aminohydroxyanthraquinone is produced which is insoluble in the resulting sulfuric acid, after adjustment of the temperature, if required, but impurities if present are retained in solution; and the second salt may then be separated from the remaining solution.

The invention will be further described in connection with the production of diaminoanthrarufine disulfonic acid from a technical diaminoanthrarufine disulfonic acid containing diaminochrysazine disulfonic acid and impurities resulting from the sulfonation, then nitration, and then reduction of technical anthrarufine. The invention is not limited thereto, however, but may be applied for the obtainment of other aminohydroxyanthraquinones in a purified condition, particularly the sulfonic acids of aminohydroxyanthraquinones, and especially the diamino-polyhydroxy-anthraquinone mono- and disulfonic acids containing amino and hydroxyl groups in the alpha-positions of the anthraquinone nucleus; as for example, diaminoanthrachrysone disulfonic acid, diaminochrysazine sulfonic acids, diaminodisulfonic acids of anthraflavic and isoanthraflavic acids, etc.

Crude diaminoanthrarufine disulfonic acid sodium salt containing diaminochrysazine disulfonic acid sodium salt and resulting from the sulfonation of technical or commercial anthrarufine (containing chrysazine), nitration of the resulting sulfonic acids, and reduction of the resulting nitro compounds with an alkali metal sulfide in alkaline solution, may be warmed with concentrated sulfuric acid, whereby the diaminoanthrarufine disulfonic acid is converted to an amine salt which is insoluble in said concentrated sulfuric acid while the diaminochrysazine disulfonic acid and other impurities are dissolved in said sulfuric acid. It is noted, while diaminochrysazine disulfonic acid is itself a useful product, its presence in diaminoanthrarufine disulfonic acid is undesirable for certain uses of the latter. Hence, for the purpose of the present invention it is to be regarded as an impurity from the standpoint of purification of diaminoanthrarufine disulfonic acid. The solution of impurities then may be separated from the suspension of the insoluble salt, preferably after permitting the mixture to cool to a temperature below about 30° C. The residue, after washing with additional concentrated sulfuric acid to remove adhering impurities, if desired, may be treated with water, whereby a solution of purified diaminoanthrarufine disulfonic acid in dilute sulfuric acid is obtained from which the dyestuff may be recovered in the well known manner, as for example, by salting out with common salt. The concentration of sulfuric acid employed may vary within wide limits as may also the temperature at which the treatment is effected. Preferably sulfuric acid of about 65 per cent. to about 80 per cent. may be employed for the extraction, which may be carried out at temperatures varying from about 20° to about 90° C.

Instead of extracting impurities from the diaminoanthrarufine disulfonic acid, the crude or technical diaminoanthrarufine disulfonic acid may be dissolved in sulfuric acid of a concentration in excess of about 80 per cent., and particularly of 90 to 100 per cent. strength, preferably with gentle heating, as for example, at a temperature of about 60° C. In order to increase the purification effected by the process, boric acid may be included in the sulfuric acid solution, preferably in an amount at least sufficient to form the boric esters of the diaminodihydroxyanthraquinone disulfonic acids present. The resulting solution may then be cooled and diluted with water, or its equivalent, in an amount sufficient to reduce the sulfuric acid strength to a value within the range of about 40 to about 80 per cent., and preferably about 60 to about 75 per cent., sulfuric acid to precipitate the salt of the diaminoanthrarufine disulfonic acid. The resulting mixture may be allowed to stand, preferably while maintaining its temperature below 30° C.

to complete the precipitation of the diaminoanthrarufine disulfonic acid salt, and the resulting salt then may be separated and treated as hereinbefore described.

In carrying out the purification of diaminoanthrarufine disulfonic acid in conjunction with its production by reduction of dinitroanthrarufine disulfonic acid with oleum and sulfur in the presence of boric acid, the resulting reaction mixture may be diluted, preferably with ice water, while maintaining the temperature sufficiently low to avoid decomposition, local overheating and side reactions. The proportions of reagents and conditions of the reduction may be varied, as is well known to the art. Thus, oleum varying in strength from about 10 to about 65 per cent. may be employed at a temperature depending upon the concentration of the oleum used; the more concentrated the oleum, the lower the temperature. The amount of boric acid employed may also vary, the amount preferably being sufficient to form the boric esters of the diaminodihydroxyanthraquinone disulfonic acids present in the reduced reaction mixture. The sulfur is preferably employed in an amount at least sufficient to react with the oleum to form sufficient reducing agent to reduce at least all of the nitro compounds present to their corresponding amino bodies. In carrying out the reduction, the sulfur and dinitroanthrarufine disulfonic acid are preferably simultaneously added to a preformed solution of the boric acid in the oleum, which is preferably at a reactive temperature, i. e., a temperature adapted to bring about the reduction. The extent to which the reduced reaction mixture is diluted may vary. In general, it is diluted to a sulfuric acid concentration within the range of about 40 to about 80 per cent. strength, and preferably within the range of 60 per cent. to 75 per cent. strength. The precipitated diaminoanthrarufine disulfonic acid salt resulting from the dilution of the reduced reaction mixture may be separated from the remaining solution of impurities in any suitable manner and recovered and subsequently treated as above described.

As illustrative embodiments of ways in which the invention may be practiced, the following examples are presented. The parts are by weight.

*Example 1.*—12 parts of a dry technical diaminodihydroxyanthraquinone disulfonic acid containing about 10 parts of a mixture consisting of a major proportion of diaminoanthrarufine disulfonic acid and a minor proportion of diaminochrysazine disulfonic acid in the form of their sodium salts, are added to 100 parts of sulfuric acid (66° Bé.) at a temperature of about 60° C. The dyestuff does not completely dissolve but changes to a yellow colored body which remains in suspension in the acid. The mixture is cooled to about 30° C., allowed to stand for 12 to 15 hours, and then filtered on an Alundum plate filter. The residue is washed with about 10 to 20 parts of sulfuric acid of 66° Bé. and then is treated with about 200 parts of water. Diaminoanthrarufine disulfonic acid is salted out of the resulting solution by the addition thereto of common salt, is filtered off, washed with salt solution until free from acid, and then dried. The diaminochrysazine disulfonic acid present as the sodium salt in the initial material may be recovered from the sulfuric acid mother liquor in any suitable manner. Thus, by drowning the liquor in water, with or without the addition of salt, it is obtained in a crude form.

*Example 2.*—4 parts of dry orthoboric acid are dissolved in 200 parts of sulfuric acid (66° Bé.) at a temperature of 60° C., and to the solution at this temperature there is gradually added, with stirring, 12 parts of a dry technical diaminodihydroxyanthraquinone disulfonic acid of the same composition as that used in Example 1. When all has dissolved, the solution is cooled to 20° C. or lower and an amount of water is added thereto sufficient to give a concentration of sulfuric acid of about 75 per cent. strength (about 47 parts), keeping the temperature of the mixture below 20° C. After standing for 4 or 5 hours, the yellowish-green crystals which separate out are filtered off and washed with sulfuric acid of 75 per cent. strength. The crystals are then treated with ice water (about 300 parts), the solution is stirred for a short time (25 to 30 minutes), common salt is added in quantity sufficient to saturate the solution, or nearly so, and after stirring for a while longer (30 to 40 minutes) the precipitated diaminoanthrarufine disulfonic acid thus obtained is filtered off and washed acid free with a 5 per cent. salt solution. The product thus obtained is free, or nearly so, of diaminochrysazine disulfonic acid.

*Example 3.*—4.2 parts of boric acid crystals are dissolved in 200 parts of 26 per cent. oleum, and to the solution maintained at a temperature of about 25° C. there is slowly added, with stirring, a mixture of 3.5 parts of sulfur with 10 parts of technical dinitroanthrarufine disulfonic acid, containing mainly dinitroanthrarufine disulfonic acid in the form of its sodium salt together with the sodium salt of dinitrochrysazine disulfonic acid and impurities resulting from the production of the dinitroanthrarufine disulfonic acid from technical anthrarufine. The resulting mixture is stirred and the temperature is allowed to rise to 45° C. The mixture is then heated for about an hour and a half at 55° to 60° C. The solution thus obtained is cooled to about 30° C., and then diluted by gradual addition thereto of 92 parts of water, the temperature rising to 75° to 80° C. The solution is then cooled to about 30° C. and the precipitate which is formed is filtered off and washed with 50° Bé. sulfuric acid. The precipitate is then treated with a solution of 6.3 parts of common salt in 150 parts of water and, after stirring for about an hour, the resulting precipitate is filtered off and washed acid-free with a 4° to 5° Bé. common salt solution. The diaminoanthrarufine disulfonic acid thus obtained is in a purified state.

The process of the above examples is not limited to the treatment of diaminoanthrarufine disulfonic acid containing diaminochrysazine disulfonic acid but may also be employed for the production or recovery of a purified diaminoanthrarufine disulfonic acid from an impure diaminoanthrarufine disulfonic acid which contains no diaminochrysazine disulfonic acid. Furthermore, the invention also may be employed for the production, recovery and/or purification of diaminochrysazine disulfonic acid as well as other hydroxyaminoanthraquinones, as above indicated, by adjustment of the sulfuric acid concentration.

The process also may be employed, as above indicated, for the step by step separation of a plurality of aminohydroxyanthraquinones, and especially isomeric aminohydroxyanthraquinones, by first separating one aminohydroxyanthraquinone from a mixture of a plurality thereof and then separating another of said aminohydroxyanthraquinones from the remaining mixture; as illustrated by the following example. The parts are by weight.

*Example 4, Part 1.*—4 parts of boric acid crystals are dissolved in 80 parts of 65 per cent. oleum, and to the solution maintained at a temperature of about 30° C. there is slowly added, with stirring, a mixture of 3.5 parts of sulfur with 10 parts of technical dinitroanthrarufine disulfonic acid, containing mainly dinitroanthrarufine disulfonic acid in the form of its sodium salt together with the sodium salt of dinitrochrysazine disulfonic acid and impurities resulting from the production of the dinitroanthrarufine disulfonic acid from technical anthrarufine. The resulting mixture is stirred at a temperature of 25° to 30° C. for 8 to 10 hours. The solution thus obtained is then diluted by addition thereto of 45 parts of ice water, thereby reducing the sulfuric acid acidity to about 65 per cent. strength, the temperature being kept below 35° C. After stirring the diluted solution for an hour or so, the precipitate which is formed is filtered off and washed with 50° Bé. sulfuric acid.

*Part 2.*—The precipitate is then treated with ice-water (about 300 parts) and after stirring for a short time (about 10 to 15 minutes), salt is added thereto to precipitate the diaminoanthrarufine disulfonic acid. After stirring the mixture for about an hour, the resulting precipitate is filtered off and washed acid-free with an 8° Bé. common salt solution.

*Part 3.*—Diaminochrysazine disulfonic acid is obtained in a purified condition from the filtrate resulting from the process of Part 1 of the present example by adding thereto ice water in an amount sufficient to reduce the sulfuric acid concentration to 30 to 40 per cent. while keeping the temperature below 35° C., stirring the diluted solution for an hour or so, filtering off the precipitate which is formed, washing it with sulfuric acid of about 30 to 40 per cent. strength, and then subjecting the precipitate to the treatment of Part 2 of the present example.

I claim:

1. A process for obtaining an aminohydroxyanthraquinone in a purified condition from a mixture of said aminohydroxyanthraquinone with impurities, which comprises separating said aminohydroxyanthraquinone in the form of an amine salt from a sulfuric acid solution of impurities.

2. A process for obtaining an aminohydroxyanthraquinone in a purified condition from a mixture of said aminohydroxyanthraquinone with impurities, which comprises treating the mixture with sulfuric acid of a concentration adapted to form a sulfuric acid solution of impurities in which solution said aminohydroxyanthraquinone is insoluble, and separating said aminohydroxyanthraquinone from the sulfuric acid solution of impurities.

3. A process according to claim 2 in which boric acid is also present.

4. A process for obtaining an aminohydroxyanthraquinone in a purified condition from a mixture of said aminohydroxyanthraquinone with impurities, which comprises forming a concentrated sulfuric acid solution of said aminohydroxyanthraquinone and impurities, diluting said solution to an extent adapted to precipitate said aminohydroxyanthraquinone in the form of an amine salt but retain impurities in solution, and separating the resulting amine salt from the diluted sulfuric acid solution.

5. A process for obtaining a diamino-polyhydroxyanthraquinone in a purified condition from a mixture of said diamino-polyhydroxyanthraquinone with impurities resulting from the reduction of a technical dinitro-polyhydroxyanthraquinone, which comprises treating the mixture with sulfuric acid of a concentration adapted to form a sulfuric acid solution of impurities in which solution said diamino-polyhydroxyanthraquinone is insoluble, and separating said diamino-polyhydroxyanthraquinone from the sulfuric acid solution of impurities.

6. A process for obtaining a diamino-polyhydroxyanthraquinone in a purified condition from a mixture of said diamino-polyhydroxyanthraquinone with impurities resulting from the reduction of a technical dinitro-polyhydroxyanthraquinone, which comprises forming a solution of said mixture in concentrated sulfuric acid, diluting said solution to a sulfuric acid concentration such that an amine salt of the diamino-polyhydroxyanthraquinone is insoluble in the solution while impurities are soluble, and separating the resulting salt of the diamino-polyhydroxyanthraquinone from the solution of impurities.

7. A process for obtaining a diamino-dihydroxyanthraquinone disulfonic acid in a purified condition from a mixture of said diamino-dihydroxyanthraquinone disulfonic acid and impurities, and resulting from the reduction of a technical dinitro-dihydroxyanthraquinone disulfonic acid, which comprises treating said mixture with sulfuric acid of a concentration adapted to form a sulfuric acid solution of impurities in which solution said diamino-dihydroxyanthraquinone disulfonic acid is insoluble, and separating the resulting solution of impurities from the diamino-dihydroxyanthraquinone disulfonic acid.

8. A process for obtaining a diamino-dihydroxyanthraquinone-disulfonic acid in a purified condition from a mixture of said diamino-dihydroxyanthraquinone-disulfonic acid and impurities, and resulting from the reduction of a technical dinitro - dihydroxyanthraquinone - disulfonic acid, which comprises treating said mixture with sulfuric acid of a concentration adapted to form a sulfuric acid solution of impurities in which solution said diamino-dihydroxyanthraquinone-disulfonic acid is insoluble, said solution also containing boric acid, and separating the resulting solution of impurities from the diamino-dihydroxyanthraquinone-disulfonic acid.

9. A process for obtaining diaminoanthrarufine disulfonic acid in a purified condition from a mixture containing diaminoanthrarufine disulfonic acid and impurities and resulting from the reduction of a technical dinitroanthrarufine disulfonic acid, which comprises treating said mixture with sulfuric acid of a concentration adapted to form a sulfuric acid solution of impurities in which solution diaminoanthrarufine disulfonic acid is insoluble, and separating the resulting solution of impurities from the diaminoanthrarufine disulfonic acid.

10. A process for obtaining diaminoanthrarufine disulfonic acid in a purified condition from a mixture of said diaminoanthrarufine disulfonic acid with impurities resulting from the reduction of a technical dinitroanthrarufine disulfonic acid, which comprises dissolving said mixture in warm sulfuric acid of a concentration not less than about 90 per cent., diluting the resulting solution to a sulfuric acid concentration within the range of about 60 per cent. to 75 per cent., cooling the diluted solution to a temperature of about 30° C.

whereby an amine salt of diaminoanthrarufine disulfonic acid separates out of said sulfuric acid solution, removing said amine salt from the remaining solution, treating said amine salt with ice water to regenerate the diaminoanthrarufine disulfonic acid, and recovering the diaminoanthrarufine disulfonic acid.

11. In the production of an alpha-diamino-alpha-dihydroxyanthraquinone disulfonic acid by the reduction of a technical alpha-dinitro-alpha-dihydroxyanthraquinone disulfonic acid with oleum and sulfur in the presence of boric acid, the improvement which comprises adjusting the sulfuric acid concentration of the reaction mixture resulting from said reduction to a value such that an amine salt of the alpha-diamino-alpha-dihydroxyanthraquinone disulfonic acid is formed which is insoluble in said sulfuric acid but impurities are retained in solution in said acid, and separating the said salt from the resulting solution.

12. In the production of diaminoanthrarufine disulfonic acid by the reduction of technical dinitroanthrarufine disulfonic acid with oleum and sulfur in the presence of boric acid, the improvement which comprises diluting the reaction mixture resulting from said reduction with water in an amount adapted to precipitate the diaminoanthrarufine disulfonic acid as an amine salt while retaining impurities in solution, separating the said salt from the diluted sulfuric acid solution, regenerating the diaminoanthrarufine disulfonic acid from said amine salt, and recovering said diaminoanthrarufine disulfonic acid.

13. In the production of diaminoanthrarufine disulfonic acid by the reduction of technical dinitroanthrarufine disulfonic acid with oleum and sulfur in the presence of boric acid, the improvement which comprises simultaneously adding the dinitroanthrarufine disulfonic acid and the sulfur to a solution of boric acid in oleum, whereby diaminoanthrarufine disulfonic acid is produced in solution, diluting the resulting reaction mixture to a sulfuric acid concentration of about 40 per cent. to about 80 per cent., whereby a salt of diaminoanthrarufine disulfonic acid is precipitated, and separating said salt from the remaining solution.

14. In the production of diaminoanthrarufine disulfonic acid by the reduction of technical dinitroanthrarufine disulfonic acid with oleum and sulfur in the presence of boric acid, the improvement which comprises adding a mixture of dinitroanthrarufine disulfonic acid and sulfur to a solution of boric acid in oleum, whereby diaminoanthrarufine disulfonic acid is produced in solution, diluting the resulting reaction mixture to a sulfuric acid concentration of about 60 per cent. to about 75 per cent., whereby a salt of diaminoanthrarufine disulfonic acid is precipitated, separating said salt from the remaining solution, and regenerating diaminoanthrarufine disulfonic acid from said salt.

15. In the production of diaminoanthrarufine disulfonic acid by the reduction of technical dinitroanthrarufine disulfonic acid with oleum and sulfur in the presence of boric acid, the improvement which comprises adding a mixture of dinitroanthrarufine disulfonic acid and sulfur to a solution of boric acid in oleum, whereby diaminoanthrarufine disulfonic acid is produced in solution, diluting the resulting reaction mixture to a sulfuric acid concentration of about 60 per cent. to about 75 per cent., and maintaining the temperature below 35° C., whereby an insoluble salt of diaminoanthrarufine disulfonic acid is produced out of solution, separating said salt from the remaining solution, decomposing said salt with ice water to form a solution of diaminoanthrarufine disulfonic acid, and salting out diaminoanthrarufine disulfonic acid from said solution.

16. A process for the separate recovery of a plurality of aminohydroxyanthraquinones from a mixture containing them, which comprises treating the mixture with sulfuric acid of a concentration adapted to form a solution in sulfuric acid of one aminohydroxyanthraquinone in which solution another aminohydroxyanthraquinone is insoluble, separating the insoluble aminohydroxyanthraquinone from the solution, adjusting the sulfuric acid concentration of the resulting solution to precipitate another aminohydroxyanthraquinone, and separating the latter from the remaining solution.

17. A process for the separate recovery of isomeric aminohydroxyanthraquinones from a mixture containing them, which comprises forming a sulfuric acid solution of said mixture, adjusting the sulfuric acid concentration of the solution to form an amine salt of one of said isomeric aminohydroxyanthraquinones, which salt is insoluble in the remaining solution, separating said insoluble salt from the remaining solution, adjusting the sulfuric acid concentration of the remaining solution to form an amine salt of another of said aminohydroxyanthraquinones, which salt is insoluble in the resulting solution, and separating the latter salt from the resulting solution.

18. A process for the separate recovery of isomeric diamino - dihydroxyanthraquinone - disulfonic acids from a mixture containing them, which comprises forming a sulfuric acid solution of said mixture, adjusting the sulfuric acid concentration of the solution to form an amine salt of one of said isomeric diamino-dihydroxyanthraquinone-disulfonic acids, which salt is insoluble in the remaining solution, separating said insoluble salt from the remaining solution, adjusting the sulfuric acid concentration of the remaining solution to form an amine salt of another of said diamino-dihydroxyanthraquinone-disulfonic acids, which salt is insoluble in the resulting solution, and separating the latter salt from the resulting solution.

19. A process for obtaining diaminoanthrarufine disulfonic acid from a composition containing diaminoanthrarufine disulfonic acid and diaminochrysazine disulfonic acid, which comprises converting the composition to a mixture of a sulfuric acid solution of diaminochrysazine disulfonic acid and an amine salt of diaminoanthrarufine disulfonic acid, which salt is insoluble in said sulfuric acid solution, and separating the amine salt from the solution.

20. A process for obtaining diaminoanthrarufine disulfonic acid from crude diaminoanthrarufine disulfonic acid containing diaminochrysazine disulfonic acid, which comprises converting the crude diaminoanthrarufine disulfonic acid with the aid of sulfuric acid to a mixture of a solution of impurities including diaminochrysazine disulfonic acid in sulfuric acid of about 50 to about 80 per cent. strength and an amine salt of diaminoanthrarufine disulfonic acid, and separating the amine salt from the solution.

21. A process for the separate recovery of diaminoanthrarufine disulfonic acid and diaminochrysazin disulfonic acid from a mixture containing them together with impurities, which comprises forming a solution of said mixture in concentrated sulfuric acid, diluting the solution to an extent adapted to precipitate the diaminoanthrarufin disulfonic acid but retain the diaminochrysazin disulfonic acid in solution, separating the precipitate from the solution, further diluting the remaining solution to an extent adapted to precipitate diaminochrysazin disulfonic acid but retain impurities in solution, and separating the resulting precipitated diaminochrysazin disulfonic acid from the resulting solution.

22. In the production of an aminohydroxyanthraquinone by the reduction of a nitrohydroxyanthraquinone with sulfur and oleum, the improvement which comprises simultaneously adding the nitrohydroxyanthraquinone and the sulfur to the oleum.

23. In the production of an aminohydroxyanthraquinone by the reduction of a nitrohydroxyanthraquinone with sulfur and oleum in the presence of boric acid, the improvement which comprises adding a mixture of the nitrohydroxyanthraquinone and the sulfur to a solution of the boric acid in the oleum.

24. In the production of an alpha-diaminoalpha-dihydroxyanthraquinone sulfonic acid by the reduction of an alpha-dinitro-alpha-dihydroxyanthraquinone sulfonic acid with sulfur and oleum, the improvement which comprises simultaneously adding the sulfur and the alpha-dinitro-alpha-dihydroxyanthraquinone sulfonic acid to the oleum.

25. In the production of an alpha-diaminoalpha-dihydroxyanthraquinone disulfonic acid by the reduction of an alpha-dinitro-alpha-dihydroxyanthraquinone disulfonic acid with sulfur and oleum in the presence of boric acid, the improvement which comprises mixing the sulfur with the alpha-dinitro-alpha-dihydroxyanthraquinone disulfonic acid, and adding said mixture to a solution of the boric acid in the oleum at a reactive temperature.

26. In the production of diaminoanthrarufine disulfonic acid by the reduction of dinitroanthrarufine disulfonic acid with sulfur and oleum in the presence of boric acid, the improvement which comprises mixing sulfur with the dinitroanthrarufine disulfonic acid, and adding said mixture to a solution of the boric acid in oleum of 10 to 65 per cent. strength, which solution is maintained at a temperature between about 25° C. and about 30° C.

DONALD G. ROGERS.

CERTIFICATE OF CORRECTION.

Patent No. 2,118,445.                                    May 24, 1938.

DONALD G. ROGERS.

It is hereby certified that error appears in the printed specification of the above numbered patent requiring correction as follows: Page 6, second column, line 69, claim 20, for the numeral "50" read 65; and that the said Letters Patent should be read with this correction therein that the same may conform to the record of the case in the Patent Office.

Signed and sealed this 28th day of June, A. D. 1938.

Henry Van Arsdale,
Acting Commissioner of Patents.

(Seal)